Feb. 7, 1933.    F. H. OWENS    1,896,246
FILM PRINTING APPARATUS
Original Filed July 13, 1927
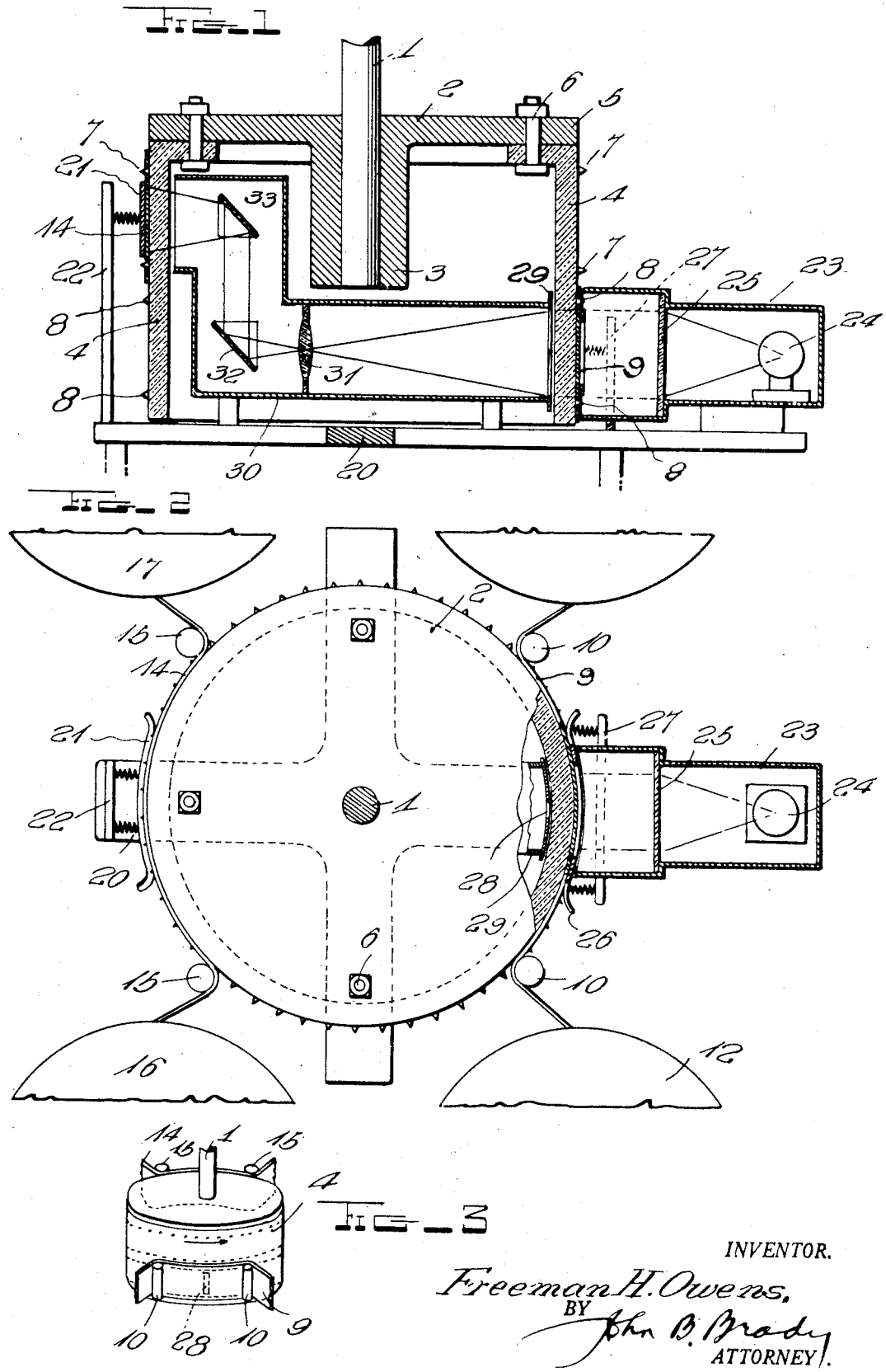
INVENTOR.
Freeman H. Owens,
BY John B. Brady
ATTORNEY.

Patented Feb. 7, 1933

1,896,246

UNITED STATES PATENT OFFICE

FREEMAN H. OWENS, OF NEW YORK, N. Y.

FILM PRINTING APPARATUS

Application filed July 13, 1927, Serial No. 205,441. Renewed October 26, 1929.

My invention relates broadly to optical printers and more particularly to a compact apparatus for printing film positives from a film negative.

One of the objects of my invention is to provide a construction of printing apparatus for sound records on film wherein the printing of the film can be conducted rapidly with minimum effort and a clear sound record secured.

Another object of my invention is to provide a construction of optical printer wherein a minimum number of parts are required and by which the printing of the film positives from a film negative may be accomplished within a small physical area by means of a cylindrical drum having optical means disposed both inside and outside of said drum for controlling the exposure of the film positive with respect to the film negative.

My invention will be more clearly understood from the specification herein following by reference to the accompanying drawing, in which:

Figure 1 is a longitudinal cross-sectional view taken through the optical printer of my invention; Fig. 2 is a top plan view of the optical printer of my invention; and Fig. 3 is a perspective view showing the cylindrical drum utilized in the optical printer of my invention.

With the development of sound picture projection systems, it is becoming necessary to record both sound and picture records in the field, make immediate developments, print a number of positives and furnish the positives to projection machines in a minimum amount of time. Numerous instances of important events which have been filmed both for picture and sound reproduction have proven how important it is to be able to place film positives in the hands of picture projection machine operators at the earliest possible moment at the end of the recording process. The optical printer of my invention is intended for rapid printing of sound records for facilitating the making of positives under conditions where copies of the film are required with minimum expenditure of time.

Referring to the drawing in detail reference character 1 designates a rotatable shaft member which carries the plate member 2 integral with hub member 3. A transparent sprocket member 4 in the form of a drum or cylinder is provided with an inturned flange 5 at the top thereof by which the cylinder or drum is supported from the plate 2 by means of suitable bolt members 6. The drum 4 is provided with independent sets of sprocket teeth which have been represented at 7 and 8, which teeth fit into the apertures in the side of the film for advancing the film during the printing process. The negative film is indicated at 9 being guided against the cylindrical surface of the drum 4 by means of roller members 10 cooperating with the supply reel 11 and take-up reel 12. The positive film is represented at 14 guided by means of rollers 15 from the supply reel 16 to the take-up reel 17. It will be noted that the negative film is guided over the surface of the drum 4 adjacent the outer edge thereof, while the positive film is guided over the cylinder 4 adjacent the inner side thereof. The arrangement of the film with respect to the drum 4 is shown more clearly in the perspective view in Fig. 3. A supporting structure 20 is provided including arms which extend substantially at right angles to each other beneath the rotatable drum 4, and one of these arms serve to support a spring pressed plate member 21 upon a standard 22 which resiliently engages the positive film 14 and presses the same against the cylindrical surface of the drum 4 during rotation of the drum. On the opposite side of the drum, I provide a lamp housing 23 which includes the light source 24 and the ground glass plate member 25 through which light rays are projected toward the negative film 9. The negative film 9 is pressed into engagement with the surface of the cylindrical drum 4 by means of a pad 26 resiliently carried by and spring pressed from the standard 27. The pad 26 is apertured to enable the light rays to pass through the negative film 9 and through the transparent drum 4 through the slit 28 formed in gate 29. Inside of the rotatable drum 4, I provide a housing and light directing conduit 30 which includes lens 31 and prisms 32 and 33. The light rays received from the source 24 pass through the slit 28 of gate 29 and through the lens 31 and are directed upwardly by prism 32 and then forwardly by prism 33, through the transparent drum 4 upon the positive film 14. I locate the lens 31 midway of the path of the light rays from one side of the drum 4 to the opposite side thereof. The cylinder 4 revolves independently of the housing 30 and serves to advance the film during the printing process at that speed required for effecting the necessary exposure for recording the sound record on the film.

While I have described my invention in one of its preferred embodiments, I desire it to be understood that modifications may be made and that no limitations are intended other than are imposed by the scope of the appended claims.

What I claim as new and desire to secure by Letters Patent of the United States is as follows:

1. An optical printer comprising a depending rotatable shaft, a plate member carried by said shaft, a homogeneous transparent cylindrical drum carried by said plate member, annular rows of sprocket teeth carried by said cylindrical drum, a film positive pressed into engagement with said sprocket teeth at one side of said drum, a film negative pressed into engagement with said sprocket teeth at the opposite side of said drum, whereby said film positive may be advanced in one direction by means of said rotary drum, while said film negative is advanced in the opposite direction, a light source arranged adjacent said film negative, and a light directing conduit disposed centrally across the interior of said drum for conveying light rays in their passage through said film negative to said film positive.

2. In an optical printer a depending rotary shaft member, a plate carried by said shaft member, a homogeneous transparent cylindrical drum supported by said plate, said drum extending over a diametrically positioned light conveying conduit, a film positive pressed into engagement with one portion of said drum, a film negative pressed into engagement with the exterior surface of another portion of said drum, a light source disposed adjacent said film negative for projecting light rays through said film negative and through said light conveying conduit to said positive film.

3. An optical printer comprising a homogeneous transparent cylindrical drum arranged to rotate on a substantially vertical axis, a light conveying conduit extending diametrically of the interior of said drum and offset from a position adjacent one end of said drum to a position adjacent the opposite end of said drum, means for pressing a film positive into engagement with the exterior surface of said drum opposite one end of said light conveying conduit, means for pressing a film negative into engagement with the diametrically opposite exterior surface of said drum in a position adjacent the other end of said light conveying conduit, a light source located adjacent one side of said film negative and remote from the exterior surface of said drum for projecting light rays through said film negative and through said light conveying conduit to the film positive on the opposite side of said drum.

4. A photographic printer for motion picture film comprising a rotatable transparent sprocket having independent sets of sprocket teeth, one set adapted to support and move a negative film on one side thereof and the other set of sprocket teeth adapted to support and move a sensitized positive film on the opposite side thereof, a light source for illuminating the negative film and means disposed within said sprocket for passing the illuminated images of said negative film to said positive film.

5. A photographic printer for motion picture film comprising a rotatable sprocket having sprocket teeth arranged in a plurality of sets, one set adapted to support and move a negative film on one side thereof and another set of said sprocket teeth adapted to support and move a sensitized positive film on the opposite side thereof, a light source for illuminating said negative film and stationary conduit means diametrically disposed in said sprocket for confining and directing the light passing therethrough.

6. A photographic printer comprising a rotatable transparent sprocket, a film negative engaged and moved by one side of said sprocket, a film positive engaged and moved by the opposite side of said sprocket and offset in position with respect to the position of the said film negative, a light source arranged adjacent said film negative for projecting light rays through said film negative and means including a lens and a plurality of reflectors for projecting the image of said film negative through said sprocket to said film positive.

7. A photographic printer comprising a rotatable transparent toothed sprocket, means for guiding a perforated film positive against a portion of the surface of said sprocket, means for guiding a perforated film negative against another portion of the surface of said sprocket, means on the surface of said sprocket for engaging the perforations of said films, a light source located adjacent said film negative and a conduit extending diametrically through the interior of said sprocket and comprising an optical system for conveying light rays which pass through said film negative to said film positive.

8. In a photographic printer, a negative film bearing thereon a photographic record, a sensitized positive film, a rotatable transparent sprocket having rows of sprocket teeth arranged in separate sets, each set adapted to independently engage and move one of said films, a light source for illuminating said negative film and means stationarily disposed within said sprocket for projecting said record from said negative film diametrically to said positive film.

9. In a printer of the character described, a rotating member adapted to carry films in definite offset spaced relation, means for illuminating one film and means including a plurality of reflectors and a lens between the films to pass light from the illuminated film across the axis of rotation of said rotating member to the other film.

10. In a printer of the character described, a rotating drum-like sprocket adapted to carry films in definite offset spaced relation on opposite sides of said sprocket, means for illuminating one film and an optical system within said sprocket for passing light from the illuminated film across the axis of rotation of said sprocket to the other film.

11. In a printer of the character described, a rotating member having a periphery having independent sets of sprocket teeth, each set adapted to separately engage one of a plurality of films, said periphery adapted to carry said films in definite spaced relation, means for illuminating one film and an optical system between the films to pass light from the illuminated film across the axis of rotation of said member to the other film.

12. In a printer of the character described, a rotating member, means for peripherally holding films in supported engagement with said member on opposite sides thereof, means including independent sets of sprocket teeth for separately engaging with and moving said films with said member, an illuminant outside one of the films in illuminating relation thereto and an optical system between the films adapted to project the image of the illuminated film across the axis of rotation of said rotating member on to the other film.

In testimony whereof I affix my signature.

FREEMAN H. OWENS.